(12) United States Patent
Miller

(10) Patent No.: US 7,261,183 B2
(45) Date of Patent: Aug. 28, 2007

(54) LUBE OIL DISTRIBUTION APPARATUS

(75) Inventor: Kent A. Miller, Pinckney, MI (US)

(73) Assignee: General Motors Corporation, Detroit, MI (US)

( * ) Notice: Subject to any disclaimer, the term of this patent is extended or adjusted under 35 U.S.C. 154(b) by 617 days.

(21) Appl. No.: 10/802,454

(22) Filed: Mar. 17, 2004

(65) Prior Publication Data
US 2005/0205359 A1    Sep. 22, 2005

(51) Int. Cl.
*F01M 1/00*    (2006.01)
(52) U.S. Cl. .................. 184/6.12; 384/372; 384/473
(58) Field of Classification Search ............. 184/6.11, 184/6.12, 11.2, 7.1; 384/372, 473
See application file for complete search history.

(56) References Cited
U.S. PATENT DOCUMENTS 4,408,808 A * 10/1983 Redmann et al. .......... 384/473
6,474,444 B1 * 11/2002 Mochizuki ................ 184/6.12
2006/0107647 A1 * 5/2006 Labala .................... 60/39.465

* cited by examiner

*Primary Examiner*—David M. Fenstermacher

(57) ABSTRACT

A lubricating distribution apparatus for a rotating shaft assembly has a shaft member rotatably supported in a pair of spaced housings. Each housing has formed therein a pocket in which a dam member is secured. A tube member has ends thereof secured to each dam member and extends axially through a passage formed in the rotating shaft. Lubrication fluid is introduced into the system between at least one of the housings and one of the dam members for lubrication fluid flow through said tube member to the other dam member. Lubrication flow between the dam members and the housings is distributed to other portions of the mechanism as well as through restricted passages toward the rotating shaft member.

5 Claims, 1 Drawing Sheet

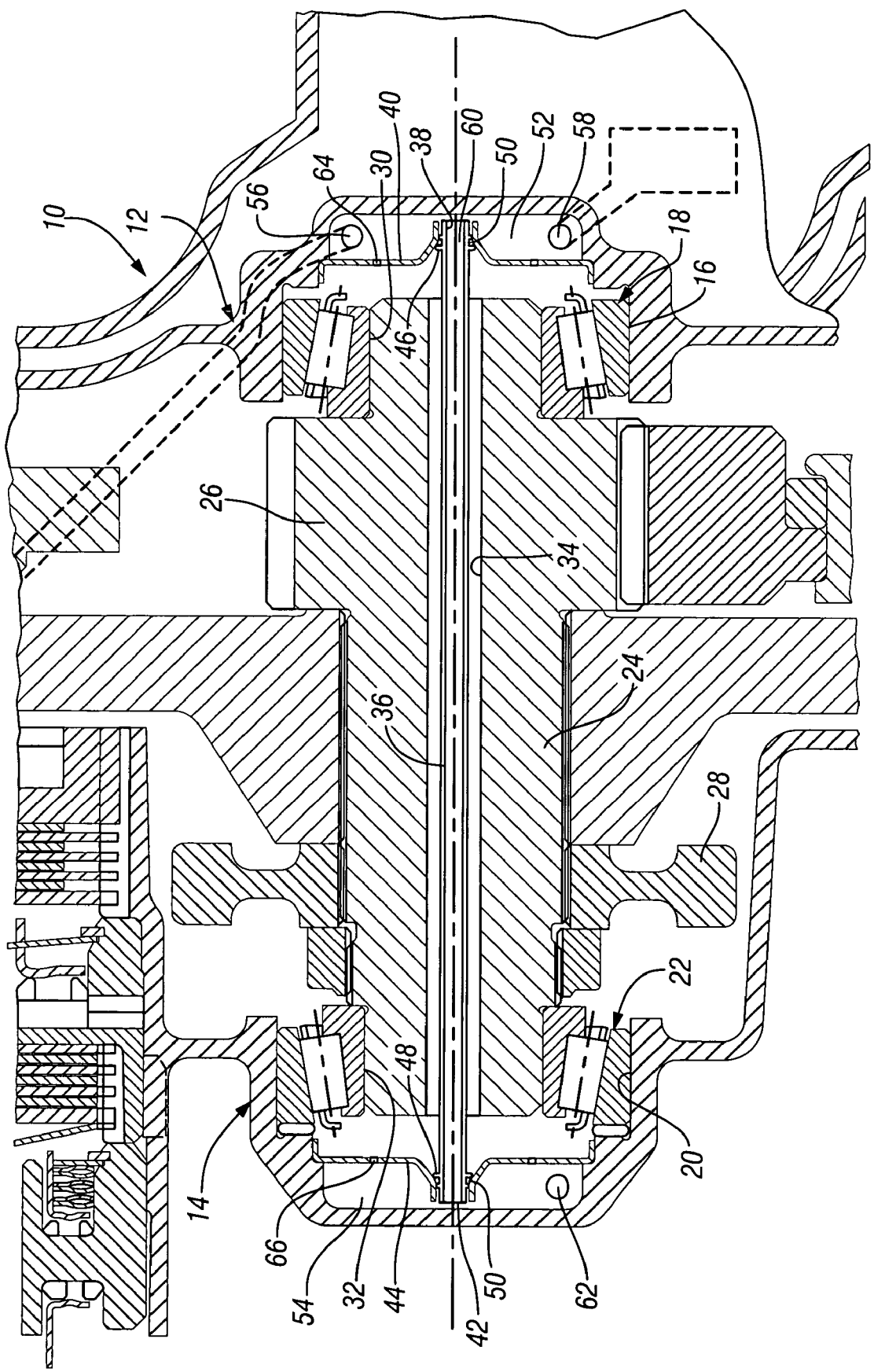

LUBE OIL DISTRIBUTION APPARATUS

TECHNICAL FIELD

This invention relates to lube systems and, more particularly, to lube systems wherein rotating parts are employed.

BACKGROUND OF THE INVENTION

Lube systems or lubrication systems, which are used in many gear mechanisms, require rotating seals to prevent oil from the lube system escaping into areas where lube is not required and, in some instances, for preventing free flow of high pressure fluid back into the lube system unintentionally. While these systems operate quite well, the use of rotating type oil seals is not a desired method of preventing oil interchange between two parts of the system.

SUMMARY OF THE INVENTION

It is an object of the present invention to provide an improved lubrication system and a rotating component assembly wherein rotating seals are not employed.

In one aspect of the present invention, a rotating shaft member has an axially extending central passage through which a stationary tube is disposed.

In another aspect of the present invention, the stationary tube is supported by dam members secured within stationary pockets of a housing, which rotatably supports the shaft member.

In yet another aspect of the present invention, lubrication fluid is provided between one dam member and the housing pocket for transmission through the stationary tube to the other dam member and stationary pocket.

In a further aspect of the present invention, each of the dam members has at least one orifice formed therein, which will permit flow of lubrication fluid to rotating mechanisms on the rotating side of the dam members.

DESCRIPTION OF THE DRAWING

The drawing is an elevational view of a portion of a transmission incorporating the present invention.

DESCRIPTION OF THE EXEMPLARY EMBODIMENT

A portion 10 of a transmission has stationary housing members 12 and 14, which are connected by fasteners, not shown. The housing 12 has a pocket or recess 16 in which a conventional tapered roller bearing 18 is disposed. The housing 14 has a pocket or recess 20 in which a conventional tapered roller bearing 22 is disposed. The tapered roller bearings 18 and 22 rotatably support a shaft member 24 on which is formed a gear member 26. The shaft 24 also has drivingly connected therewith a gear member 28. The shaft 24 has bearing ends 30 and 32 rotatably supported by the bearings 18 and 22, respectively.

A central axially-extending passage or conduit 34 is formed in the shaft 24 and extends from one bearing end to the other. A tube member 36 passes through the passage 34 in the shaft 24. The tube member 36 is secured at an end 38 by a dam member 40 and at an end 42 by a dam member 44. The tube member 36 has a pair of expanded portions 46 and 48, each of which effectively trap an O-ring 50 between each expansion portion 46 and 48 and the inside surface of the dams 40 and 44.

The dam 40 is secured in the recess 16 and cooperates therewith to form a lube chamber or area 52 and the dam 44 is secured in the recess 20 and cooperates therewith with the housing 14 to form a lube chamber or area 54. The area 52 communicates with a lube passage 56, which is connected to passages, not shown, in the housing 10 and the housing 12. The chamber 52 also has a passage or opening 58 connected therewith, which directs lubrication fluid to other portions of the transmission, not shown.

The chamber 52 communicates with a central passage 60 formed in the tube 36 for conducting fluid from the chamber 52 to the chamber 54. Fluid in the chamber 54 communicates with an opening or passage 62 for conducting lubrication fluid to other portions of the transmission.

The dam 40 has formed therein one or more orifices or restricted passages 64, which distribute controlled lubrication fluid flow from the chamber or area 52 to the bearing 18 for lubrication thereof. The dam 44 has orifices or restricted passages 66, which distribute lubrication fluid from the area or volume 54 to lubricate the tapered roller bearing 22.

It should be noted that neither end of the tube 36 has a rotating connection. The securement of the tube 36 to the dams 40 and 44 prevents leakage at these joints. It is also not required that the lubrication fluid flowing through the tube 36 be subjected to centrifugal forces communicated from the shaft 24. The lubrication fluid flowing through the restrictions 64 and 66, however, will be subjected to centrifugal forces created by the rotation of shaft 24, which will assist in distributing lubrication fluid outward to the bearings 18 and 22.

The invention claimed is:

1. A lubrication distribution apparatus for use in a system having a rotating shaft member with an axial passage extending therethrough, the lubrication distribution apparatus comprising:
   a first housing;
   a second housing;
   bearing means rotatably supporting said rotating shaft in said first and second housings;
   a first pocket formed in said first housing and a second pocket formed in said second housing;
   a first dam member secured in said first pocket;
   a second dam member secured in said second pocket; and
   a hollow lubrication oil transfer tube extending through the axial passage, sealingly secured between and supported by said first and second dam members.

2. The lubrication distribution apparatus defined in claim 1 wherein at least one of said first dam member and said second dam member has formed therein restricted flow passages for permitting lubrication fluid to flow from said pocket toward said rotating shaft member.

3. The lubrication distribution apparatus defined in claim 1 wherein each of said dam members has at least one restricted flow passage communicating fluid from each respective pocket toward said rotating shaft member.

4. A lubrication distribution apparatus for use in a system having a rotating shaft member comprising:
   a first housing;
   a second housing;
   bearing means rotatably supporting said rotating shaft in said first and second housings;
   a first pocket formed in said first housing and a second pocket formed in said second housing;
   a first dam member secured in said first pocket;
   a second dam member secured in said second pocket, wherein at least one of said first dam member and said second dam member has formed therein a plurality of restricted flow passages for permitting lubrication fluid to flow from said pocket toward said rotating shaft member; and a lubrication oil transfer tube secured between said first and second dams and passing through a centrally disposed axial passage formed in said shaft.

5. A lubrication distribution apparatus for use in a system having a rotating shaft member comprising:

a first housing;

a second housing;

bearing means rotatably supporting said rotating shaft in said first and second housings;

a first pocket formed in said first housing and a second pocket formed in said second housing;

a first dam member secured in said first pocket;

a second dam member secured in said second pocket, wherein each of said dam members has at least one restricted flow passage communicating fluid from each respective pocket toward said rotating shaft member; and a lubrication oil transfer tube secured between said first and second dams and passing through a centrally disposed axial passage formed in said shaft.

* * * * *